United States Patent [19]

Mamourian et al.

[11] 4,285,921
[45] Aug. 25, 1981

[54] PROCESS FOR PREPARATION OF WET PHOSPHORIC ACID

[75] Inventors: Armand Mamourian, Ales; Francois Bousquet, Paris; Jacques Helgorsky, Frepillon, all of France

[73] Assignee: Rhone-Poulenc Industries, Paris, France

[21] Appl. No.: 107,845

[22] Filed: Dec. 28, 1979

Related U.S. Application Data

[63] Continuation of Ser. No. 923,793, Jul. 12, 1978, abandoned.

[30] Foreign Application Priority Data

Jan. 12, 1978 [FR] France .................................. 78 00771

[51] Int. Cl.$^3$ ............................................... C01B 25/16
[52] U.S. Cl. .............................. 423/321 S; 423/321 R
[58] Field of Search .................... 423/319, 320, 321 R, 423/321 S

[56] References Cited

U.S. PATENT DOCUMENTS

| 4,083,937 | 4/1978 | Toshimitsu et al. | 423/321 S |
|---|---|---|---|
| 4,118,462 | 10/1978 | Desire et al. | 423/321 S |

*Primary Examiner*—O. R. Vertiz
*Assistant Examiner*—Gregory A. Heller

[57] ABSTRACT

The invention relates to the purification of wet phosphoric acid in which raw, wet acid extracted by means of a solvent, desulfated by means of a calcium ion aqueous solution and regenerated by means of water, is then treated with water vapor or hot gases by which a concentrated solution of phosphoric acid with a ponderal ratio $F/P_2O_5$ less than 10 ppm is obtained.

8 Claims, No Drawings

PROCESS FOR PREPARATION OF WET PHOSPHORIC ACID

This is a continuation of application Ser. No. 923,793, filed July 12, 1978, now abandoned.

This is an improvement over the invention described in the co-pending application Ser. No. 741,626, filed Jan. 6, 1977, and entitled "Process for the Preparation of Purified Phosphoric Solutions from Phosphoric Acid", which in turn was a continuation of application Ser. No. 549,470, filed Feb. 13, 1975.

The present invention relates to a purification process of a wet phosphoric acid; more particularly, it relates to a defluorination process which results in a phosphoric acid usable in food products.

It is known that when an acid attacks natural phosphated rocks, a raw phosphoric liquor is obtained after filtration containing numerous anionic and cationic impurities among which are metallic ions, such as ions of Al, Fe, and anions, such as those in the attack acid, in addition to fluoride, fluosilicate from the impurities in the rocks, etc. This impure acid is unfit for certain applications and this is why various purification processes have been proposed. Notably, the presence of fluorine in any form—namely as fluoride ion, fluosilicic ion or a fluorine-metal complex—forbids it from being used in the food industry. The food industry needs a phosphoric acid but one in which the fluorine content by weight with respect to the $P_2O_5$ content of the aqueous solution is less than 10 parts per million (ppm).

The various fluorine elimination processes which have been proposed consist mainly of precipitating the fluorine of the raw phosphoric liquor in the form of alkaline or alkaline earth metal fluosilicates. Another process consists of extracting the fluorine from the raw acid by means of water vapor or volatilizing the compound as a hot gas (HF or $SiF_4$). At best, the result of these processes is a phosphoric acid with an $F/P_2O_5$ content of 500 ppm, which is still unsuitable for usage in the food industry.

In the above mentioned copending application Ser. No. 741,626, description is made of a purification process for a raw, wet aqueous acid which, generally speaking, consisted of the extraction of a raw acid by means of a substantially water immiscible organic solvent in the presence of a strong acid, the removal of sulphate ions from the organic solution by means of an aqueous solution containing calcium ions, then the regeneration of the phosphoric acid by means of water. The result was an aqueous solution of phosphoric acid substantially free of cationic impurities but still with an $F/P_2O_5$ content of up to 7000 ppm, which made it still unsuitable to be used in foods intended for human consumption.

The object of the present invention is to provide a perfected defluorination process for a wet phosphoric acid in which impure phosphoric acid solution from the acid attack on natural rocks is extracted continuously in the form of a purified and relatively concentrated solution and in a proportion higher than 95%; in which impure phosphoric acid is extracted by counter-flow in the presence of sulfuric acid and water by means of a substantially water immiscible organic solvent; and an aqueous phase containing most of the impurities and an organic solvent phase from which phosphoric acid is reextracted, are separated; a process according to which in step one, impure phosphoric acid is extracted by counter-flow in the presence of sulfuric acid and water by means of a substantially water immiscible organic solvent chosen from the aliphatic alcohols which contain less than 8 carbon atoms in the molecule; in step two, the separated organic phase containing the phosphoric acid and the sulfuric acid is treated by contact with an aqueous solution containing phosphate ions and calcium ions in solution prepared from calcium phosphate, phosphoric acid and water, in respective quantities such that the calcium ion content in solution is between 2 to 6% by weight expressed in CaO, so as to precipitate sulphate ions in the form of calcium sulphate and put them in suspension in the aforementioned solution; in step three, the organic phase containing the phosphoric acid is washed with water; and in step four, the phosphoric acid is extracted from the organic phase by means of an aqueous phase, characterized in that the organic solvent is separated from a purified aqueous solution which constitutes the product, this resulting in an aqueous solution of phosphoric acid substantially free of cationic impurities and partially defluorinated; further characterized in that the aqueous solution of phosphoric acid thusly purified is treated with water vapor or hot gas, and this results in the recovery of the final product which is a concentrated solution of defluorinated phosphoric acid with ponderal ratio $F/P_2O_5$ less than 10 ppm.

According to the invention, the aqueous solution of phosphoric acid, from reextraction of the organic phase with water in counter-flow, generally has a phosphoric acid concentration expressed as $P_2O_5$ comprised between 15 and 30% and preferably between 20 and 26%, and a fluorine concentration expressed by the ponderal ratio $F/P_2O_5$ comprised between 1000 ppm and 7000 ppm, the fluorine being substantially present in the form of hydrofluoric acid and fluosilicic acid.

Generally speaking, the process in the invention involves treating the previous aqueous solution with water vapor or hot gas. Taking into account the fluorine compounds in the solution, it is possible, under these conditions, to entrain the fluorine in the vapor phase in the form of hydrofluoric acid and $SiF_4$, which is separated from the aqueous solution, and to extract the fluorine solution to an $F/P_2O_5$ value less than 10 ppm. By doing this, the aqueous solution of phosphoric acid, which is generally diluted, undergoes concentration which can go as high as 55% of $P_2O_5$.

In variant one of the invention, the aqueous solution of phosphoric acid is treated with water vapor or hot gas in a single apparatus, according to which the aforementioned solution is concentrated and defluorinated. This treatment may be a discontinuous operation with a known type of evaporator in which either the acid solution that is heated until boiling is introduced or a current of vapor or hot gas is sent through the preheated solution at a determined temperature. The concentration-defluorination treatment can be carried out continuously, the water vapor or hot gas flow and the flow of aqueous solution of acid being co-flow or counter-flow, although the counter-flow system is preferred. The apparatus for continuous treatment may consist of one or several stages. The preferred continuous type of counter-flow apparatus consists of a multi-stage column in which the aqueous solution to be concentrated and defluorinated is introduced from the top, while the water vapor or hot gas flow intended to recover the concentrated and defluorinated phosphoric acid at the bottom of the column is introduced from below. By knowing the distribution isotherms of fluorine in the form of HF, $H_2SiF_6$, $SiF_4$, between a phosphoric acid solution and its vapor, it is then possible to determine the choice of parameters of the apparatus and its operation parameters pertaining to the number of stages, the temperatures, pressures, and flow rates, for pre-established values of the final acid concentration and of its fluorine extraction. Other types of multi-stage, continuous apparatus which can be used consist of well known liquid-gas contactor devices such as a packing column, plate-column, pulverization column, etc.

The temperature measured in the apparatus is between 105° C. to 135° C. and more specifically between 120° C. and 130° C., and the pressure may be equal to or less than atmospheric pressure and generally between 0.6 bar and 1 bar, these two parameters being related.

In variant two, the regenerated aqueous solution of phosphoric acid, substantially free of cations, is first concentrated in step one to the final concentration desired by means of water vapor or hot gas; by doing this, part of the fluorine in the solution goes into the vapor phase, taking into account the operating conditions, but the ponderal ratio $F/P_2O_5$ obtained after this concentration does not reach the low value required by an acid for food consumption. It is for this reason that the solution obtained in step one then undergoes a final treatment of defluorination per se by means of water vapor or hot gas.

In variant two, step one, the apparatus for concentrating the acid is made up of well-known types of discontinuous or continuous, co-flow or counter-flow evaporators. For energy conservation reasons, a counter-flow, triple effect type of apparatus is preferred. Because of the distribution isotherms of water between a phosphoric acid aqueous solution and its vapor, it is possible to determine the operating conditions for a predetermined final concentration in $P_2O_5$ from a given diluted solution. In general, this is carried out under pressure conditions, the pressure increasing in the direction of the phosphoric acid flow and comprised preferably between 0.07 bar and 1.3 bar, and according to temperature conditions, the temperature increasing in the direction of the phosphoric acid flow and comprised between 50° C. and 145° C. Under these conditions, if a diluted solution with a concentration in $P_2O_5$ of approximately 20% is introduced, a solution with a concentration in $P_2O_5$ of approximately 50% will result.

In variant two, step two, the aqueous solution of phosphoric acid, which is concentrated to the desired value as a result of step one, undergoes thorough defluorination by contact with water vapor or hot gas. The apparatus used in this step is a known gas-liquid contact device which operates continuously or discontinuously, by co-flow or by counter-flow. However, a multi-stage, counter-flow device such as a plate-column is preferred. The phosphoric acid solution entering the multi-stage counter-flow apparatus is generally preheated to its initial boiling point under pressure in the apparatus and it is maintained at this temperature. The water vapor flow is also superheated to the abovementioned temperature so that no perceptible variation of the $P_2O_5$ concentration in the solution occurs. By knowing the distribution isotherms of fluorine between a phosphoric acid aqueous solution and its vapor phase, it is possible to define the choice of parameters pertaining to the number of stages of the apparatus and its operating conditions so that from a determined initial acid, a predetermined extraction of fluorine is the result. The temperature in the contactor is usually higher than or equal to 130° C. and the pressure is higher than or equal to 1 bar.

The process in the invention allows for the fluorine present in the aqueous regeneration solution of phosphoric acid to be eliminated at a ponderal ratio $F/P_2O_5$ dependent on the choice of operating conditions and the makeup of the device. Notably, fluorine extraction, such that the $F/P_2O_5$ ratio is less than 10 ppm, can be easily obtained.

The result of the process is a phosphoric acid which can be used in the food industry, and notably for human consumption.

The following examples are given by way of illustrations and not by way of limitation of the invention.

EXAMPLE 1

Simultaneous concentration and defluorination of a diluted solution of phosphoric acid obtained by regeneration with water according to the aforementioned parent application and containing 2000 ppm of fluorine.

In this example, a decationed phosphoric acid obtained according to Example 2 of the copending application and the $P_2O_5$ content of which is 25%, is used. This solution is introduced from the top of a plate-column with a number of plates, theoretically four, and which operates by counter-flow. The initial temperature of the acid is 110° C. From the base of the column, a flow of hot combustion gases is introduced at 300° C. at a pressure of 1 bar, the weight ratio of the water vapor flow to the flow of phosphoric anhydride being 40/1. At the bottom of the column, a solution of phosphoric acid is recovered with a temperature of 135° C., the ponderal content in $P_2O_5$ of which is 55% and the ponderal ratio $F/P_2O_5$ is 10 ppm.

EXAMPLE 2

This example illustrates the second method for using the invention and consists of a previous concentration of aqueous solution of phosphoric acid from water regeneration of the organic phase in conjunction with partial defluorination; then there is a subsequent step of thorough defluorination, the concentration of $P_2O_5$ of the acid remaining substantially unchanged.

In the first step for concentration-partial defluorination of the decationed phosphoric acid solution, a triple effect contactor operating in counter-flow is used for an apparatus. The first exchanger is the parallelepipedic shell type made of stainless steel and 7 meters high; the second and third exchangers are the tube and shell type made of graphite and 6.1 meters high. A phosphoric acid flow of 16.7 tons/hour is sent in, their concentration and content in fluorine and silica are given below:

| | |
|---|---|
| Ponderal content in $P_2O_5$ | 15% |
| Ponderal ratio $F/P_2O_5$ | 6150 ppm |
| Ponderal ratio $SiO_2/P_2O_5$ | 2300 ppm |

The water vapor is introduced in the proportion of 2.6 tons per ton of $P_2O_5$ introduced. In the table below, the operating elements and the results obtained are given.

|  | Temp °C. | Absolute pressure mm Hg | Content of phosphoric acid solution | | | |
|---|---|---|---|---|---|---|
|  |  |  | $P_2O_5$ content | | | $SiO_2$ /mgl |
|  |  |  | Inlet | Outlet | $F/P_2O_5$ |  |
| Exchanger 3 | 50 | 100 | 15 | 20.5 | 6150 | 800 |
| Exchanger 2 | 77 | 300 | 20.5 | 25 | 6050 | 1140 |
| Exchanger 1 | 130 | 760 | 25 | 50.5 | 800 | 190 |

The acid solution leaving exchanger No. 1 of the triple effect contactor is preheated to a temperature of 164° C. and is then introduced continuously at the plate column head consisting, theoretically, of five plates, and a water vapor flow of 0.8 ton/ton of $P_2O_5$ is introduced at the base at a temperature of 164° C., the pressure in the column being 2.5 bars. The product is extracted at the bottom of the column. The solution obtained contains 51% $P_2O_5$, its ponderal ratio $F/P_2O_5$ is 7 ppm.

We claim:

1. In a process for the preparation of purified phosphoric acid from wet, raw phosphoric acid containing sulphate and fluoride components said sulphate component for sulphuric acid by contacting the raw phosphoric acid with a substantially water immiscible aliphatic $C_4$-$C_8$ alcohol to form an aqueous phase and an organic liquid phase containing extracted phosphoric acid, some sulphate ions and fluorides, separating the organic liquid phase from the aqueous phase, contacting the separated organic phase with an aqueous solution containing calcium ion to precipitate out sulphate ion, as calcium sulphate, containing the remaining organic phase with an aqueous phase whereby phosphoric acid transfers from the organic phase to the aqueous phase with some of the fluoride in the form of HF or $SiF_4$ thereby to provide an aqueous solution of phosphoric acid substantially free of cationic impurities and partially defluorinated, the improvement in which the aqueous solution is treated with water vapor or hot gas thereby to produce a defluorinated aqueous solution having a ponderal ratio of $F/P_2O_5$ of less than 10 ppm.

2. A process as claimed in claim 1 which includes the step of concentrating the defluorinated aqueous solution.

3. A process as claimed in claim 2 in which the $P_2O_5$ concentration in the aqueous solution of phosphoric acid substantially free of cationic impurities is within the range of 15 to 30% $P_2O_5$ and a ponderal ratio $F/P_2O_5$ as high as 7000 ppm.

4. A process as claimed in claim 3 in which the final concentrated acid obtained as product has a $P_2O_5$ content between 50 and 55%.

5. A process as claimed in claim 4 in which the concentration and defluorination is carried out discontinuously in a single apparatus by injecting water vapor or hot gases into the acid solution at a temperature of about 135° C.

6. A process as claimed in claim 4 in which the concentration and defluorination is carried out in a single counter-flow multi-stage liquid vapor contactor by means of water vapor or hot gases at a temperature of about 135° C. and at a pressure of about 1 bar.

7. A process as claimed in claim 4 in which the acid is concentrated and partially defluorinated continuously by counter-flow with water vapor in a multi-effect contactor and the resulting solution is defluorinated in a multi-stage, counter-flow contactor by means of water vapor.

8. A process as claimed in claim 7 in which the multi-effect contactor operates at temperatures within the range of 50° to 130° C. and at a pressure within the range of 100 to 760 mm Hg and the multi-stage contactor operates at a temperature within the range of 135° to 165° C. and at a pressure within the range of 1 to 2.5 bar.

* * * * *